United States Patent [19]
Frazee et al.

[11] Patent Number: 5,912,556
[45] Date of Patent: Jun. 15, 1999

[54] MAGNETIC SENSOR WITH A CHIP ATTACHED TO A LEAD ASSEMBLY WITHIN A CAVITY AT THE SENSOR'S SENSING FACE

[75] Inventors: Lawrence E. Frazee; Lamar F. Ricks; Paul E. Smith, all of Freeport, Ill.

[73] Assignee: Honeywell Inc., Minneapolis, Minn.

[21] Appl. No.: 08/744,592

[22] Filed: Nov. 6, 1996

[51] Int. Cl.⁶ .............................. G01B 7/14; G01B 7/30; G01R 33/06; H01L 43/08

[52] U.S. Cl. ................................ 324/207.2; 324/207.21; 324/207.25

[58] Field of Search .......................... 324/207.2, 207.21, 324/207.22, 207.25, 207.26, 251; 338/32 H, 32 R

[56] References Cited

U.S. PATENT DOCUMENTS

| | | | |
|---|---|---|---|
| 5,444,370 | 8/1995 | Wu ........................................ | 324/207.2 |
| 5,469,055 | 11/1995 | Mueller et al. ..................... | 324/207.21 |
| 5,477,143 | 12/1995 | Wu ....................................... | 324/207.21 |
| 5,500,589 | 3/1996 | Sumcad ................................ | 324/207.2 |
| 5,545,986 | 8/1996 | Ariyoshi et al. ................... | 324/207.21 |
| 5,572,120 | 11/1996 | Takaishi et al. .................... | 324/207.21 |

*Primary Examiner*—Jay M. Patidar
*Attorney, Agent, or Firm*—William D. Lanyi; John G. Shudy; Roland W. Norris

[57] ABSTRACT

A geartooth sensor is provided with a carrier shaped to form a cavity in which semiconductor chips can be disposed. The carrier partially encapsulates a permanent magnet and a lead assembly. Unencapsulated portions of the lead assembly are exposed within the cavity to permit semiconductor components to be attached to a portion of the lead assembly. A cover is attached to the carrier to seal the cavity and protect the magnetically sensitive components located therein. The carrier, with its associated lead assembly and permanent magnet, can then be attached to a printed circuit board and a support structure to form a geartooth sensor. A protective enclosure can be disposed over the sensitive components of the geartooth sensor.

19 Claims, 5 Drawing Sheets

MAGNETIC SENSOR WITH A CHIP ATTACHED TO A LEAD ASSEMBLY WITHIN A CAVITY AT THE SENSOR'S SENSING FACE

BACKGROUND OF THE INVENTION

1. Field of the Invention:

The present invention is generally related to a magnetic sensor and, more particularly, to a geartooth sensor in which a carrier is shaped to form a cavity within its sensing face and in which a magnetically sensitive chip is attached directly to one of a plurality of leads.

2. Description of the Prior Art:

Many different types of magnetic sensors, including geartooth sensors, are well known to those skilled in the art. U.S. Pat. No. 5,500,589, which issued to Sumcad on Mar. 19, 1996, describes a magnetic sensor with a carrier that has a cavity shaped to receive a magnet in sliding association therein. Ribs are provided to guide the movement of the magnet into the cavity and a deformable rib is used to hold the magnet at a precise position determined by an active calibration process. A magnetically sensitive component is rigidly attached to a substrate and the substrate is rigidly attached to the carrier in which the cavity is formed. Electrically conductive leads are molded into the carrier and extend through the carrier to positions where they can be electrically connected to circuit runs on the substrate A flexible wall can also be formed in the carrier to deflect in response to the insertion of a magnet into the cavity. This provides additional holding capability that retains the magnet in position when an external force is removed.

U.S. Pat. No. 5,477,143, which issued to Wu on Dec. 19, 1995, describes a proximity sensor that has two magnetoresistive elements in a common plane and displaced from a lateral surface of a permanent magnet. The common sensing plane of the magnetoresistive elements extends in a direction parallel to a magnetic axis of a permanent magnet that extends between the north and south poles of the magnetic. A detection zone is defined relative to a preselected magnetic pole face and the magnetoresistive elements provide first and second signals that can be compared to define a third signal which is representative of the presence or absence of the magnetically permeable object within the detection zone. The magnetoresistive elements can each have a plurality of magnetoresistors which are arranged in a Wheatstone bridge configuration for the purpose of providing the first and second signals described above.

U.S. Pat. No. 5,469,055, which issued to Mueller et al on Nov. 21, 1995, discloses a dual complementary target arrangement which enables targets to be formed as an integral part of a cam shaft. The complementary target arrangement is intended to be sensed by a geartooth sensor.

U.S. Pat. No. 5,444,370, which issued to Wu on Aug. 22, 1995, describes a magnetic sensor that is provided with two target tracks arranged in generally parallel association with each other. Each of the target tracks comprises magnetic and nonmagnetic segments which are arranged in alternating patterns. Each magnetic segment of the first target track is disposed along side a nonmagnetic segment of the second target track and each magnetic segment of the second target track is disposed along a nonmagnetic segment of the first target track.

As a result of government regulations and the desire, by automobile manufactures, for the ability to provide misfire detection in automobile engines, the required accuracy and repeatability of automotive geartooth sensors have been steadily increasing in recent years. In combination with these increasing requirements, operating conditions of geartooth sensors now include increased airgap dimensions and axial runout conditions In order to properly operate with increased airgap and increased axial runout conditions, larger effective magnetic signals are required to improve the signal to noise ratio of the device. The magnitude of the effective magnetic signals in a geartooth sensor can be increased by increasing the size and strength of the permanent magnet or, alternatively, by decreasing the distance between the permanent magnet and the target. If the size and strength of the magnet are increased, the overall costs of the geartooth sensor will also be increased. A less expensive alternative method to produce larger magnetic signals is to design a packaging concept for the geartooth sensor that will minimize the distance between the permanent magnet and the ferromagnetic target. This reduction in the distance between the magnet and the target can also permit smaller permanent magnets to be used at a reduced cost.

In DC coupled geartooth sensors, mismatches and offsets of the magnetic sensing elements or components are also very important. In effect, it is the ratio of the magnetic signal to the offset magnitude of the magnetic sensing elements that is most critical to achieving high accuracy over difficult operating conditions. It would therefore be significantly beneficial if a geartooth sensor could be provided with a reduced distance between the pole face of a permanent magnet and the ultimate target, such as the ferromagnetic teeth of a gear.

SUMMARY OF THE INVENTION

A geartooth sensor made in accordance with the concepts of the present invention reduces the distance between the permanent magnet and the target. The sensor comprises a lead assembly that, in turn, comprises a plurality of individual leads made of an electrically conductive material. Typically, the individual leads of the lead assembly are disposed in a common plane for the purpose of facilitating automated assembly and manufacturing procedures. The present invention further comprises a magnet which has a pole face disposed proximate the lead assembly. The pole face of the magnet can be attached directly to a surface of the lead assembly. The lead assembly can be made of a ferromagnetic material which is 39%–42% nickel, with less than 1% each of carbon, manganese and silicon and the remaining material being iron. This material is ferromagnetic and can also serve as a ground plane for the magnetic sensitive components of the geartooth sensor. It can also serve as a pole piece that minimizes nonuniformities or "hot spots" of the magnet where the magnetization characteristics can vary. The lead assembly can be attached to the pole face of the magnet by any suitable process, such as soldering or the use of conductive epoxy. However, in certain embodiments, the lead assembly can be held in place relative to the magnet by the encapsulating plastic. The lead assembly does not have to be electrically connected to the magnet, but a low thermal resistance path is desirable in order to facilitate heat dissipation. Typically, good heat conductors are also good electrical conductors.

The present invention further comprises a carrier formed from an electrically insulative material. The lead assembly and the magnet are at least partially encapsulated within the carrier. The carrier is shaped to form a cavity proximate an unencapsulated portion of the lead assembly. The unencapsulated portion of the lead assembly is exposed within the cavity. The carrier provides a structural support for the magnet and lead assembly and also provides a means of accurately locating the module within a larger sensor assembly. The carrier is molded in such a way so as to form a cavity that exposes an unencapsulated portion of the lead assembly. This allows a magnetically sensitive component to be placed within the cavity and connected in electrical communication with at least one of the plurality of individual leads of the lead assembly. The magnetically sensitive component can then be protected by either encapsulating it with a die coating material, an injected gel or by providing a cover over the cavity within the carrier. The cover, in certain embodiments of the present invention can be transparent to certain forms of radiation in order to allow laser trimming of the die element of the magnetically sensitive component. A glass cover would permit this laser trimming operation to be performed after the total package, including the cover, is completely assembled. This final trimming, through the cover, permits the geartooth sensor to be calibrated precisely at a time after all induced stresses are in existence and can be compensated.

The magnetically sensitive components disposed within the cavity of the carrier can comprise Hall effect elements or magnetoresistive elements such as nickel-iron or other magnetically sensitive material. The cover can be made of beryllium copper.

The magnetically sensitive component can be a semiconductor chip that is attached directly to a preselected one of the plurality of individual leads of the lead assembly at the exposed unencapsulated portion within the cavity. The semiconductor chip can be attached to the lead by a conductive epoxy die attach material.

In one embodiment of the present invention, a protective enclosure is disposed around the carrier, the cover, the lead assembly and the magnetically sensitive component. This cover, which can be a metallic can, protects the elements of the geartooth sensor while requiring only a minimal thickness of material between the permanent magnet and the target in the vicinity of the sensing face.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1:
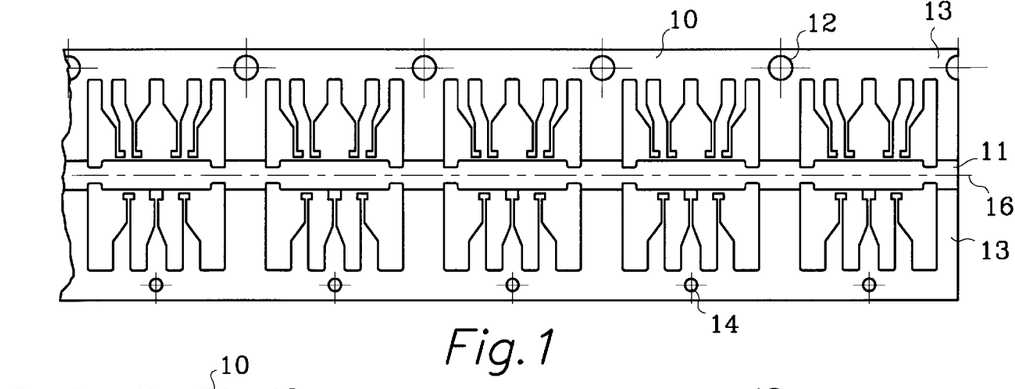
FIG. 1 illustrates a strip of material comprising a plurality of lead assemblies.

In order to provide a sensor with the characteristics and advantages described above, the present invention provides a lead assembly that comprises a plurality of individual leads arranged in a generally planar configuration. FIG. 1 illustrates a strip of material 10 that has been sequentially punched or formed to define the individual leads of a plurality of lead assemblies In order to facilitate the automated manufacture of sensors, a continuous strip of material 10 is progressively indexed through one or more punch press stations. The generally circular holes, 12 and 14, located in the strip of material are used for the purpose of moving the strip through the sequential operations and for accurately locating the strip with respect to the individual lead assemblies shown in FIG. 1 Centerline 16 is used for reference purposes in this description. The strip of material 10 can comprise three individual strips of material attached together, such as by tack welding. More specifically, a central strip of ferromagnetic material 11, such as that described above which has between 39% and 42% nickel, is disposed between two strips of a copper alloy 13. A composite strip of material 10, such as the one described immediately above, provides several advantages. For example, the central strip 11 is ferromagnetic and provides the advantageous magnetic properties that allow it to be used as a pole piece. The two other strips 13, on the other hand, are intentionally selected to be nonferromagnetic so that they do not distort the magnetic field of a permanent magnet. It should be understood that alternative embodiments of the present invention could use a single strip of material 10, but certain advantages can be achieved by using a composite strip that includes a strip of ferromagnetic material 11 combined with strips of a nonferromagnetic electrically conductive material 13.

Figure 2:
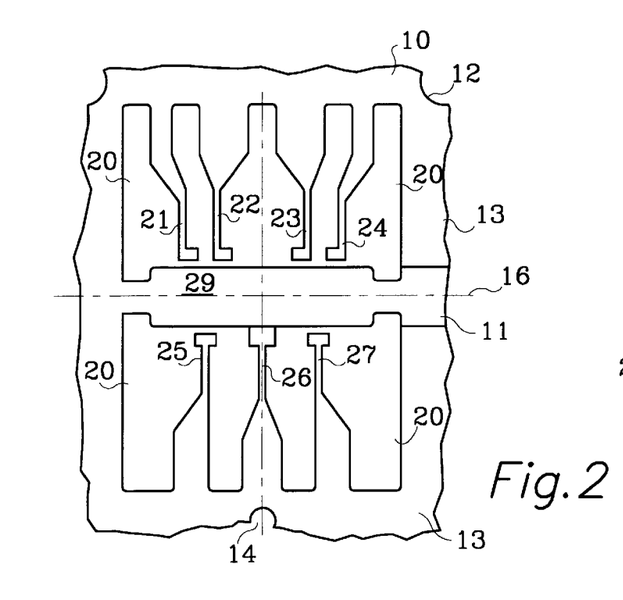
FIG. 2 is an enlarged view of one of the lead assemblies in FIG. 1.

FIG. 2 is a view of a section of the strip of material 10 shown in FIG. 1. It isolates a single lead assembly for purposes of this discussion. The portions of the strip of material 10 identified by reference numeral 20 indicate where the material has been removed. The removal of the material, in spaces 20, defines the extensions identified by reference numerals 21–27. These segments will be described in greater detail below, but it should be understood that they are intended to provide electrical leads for the sensor, either in its final form or as test points for use during manufacturing, calibration and testing. The central segment identified by reference numeral 29 is located near the centerline 16 and is intended to provide support for one or more magnetically sensitive components during a subsequent step in the manufacturing process. In certain embodiments of the present invention, the strip of material 10 is made of a ferromagnetic material, while in other embodiments alternative materials can be used. When the strip of material 11 is made of a ferromagnetic material, an additional benefit can be achieved. The ferromagnetic material, when disposed on a pole face of a permanent magnet, serves to align the magnetic field provided by the magnet and provide some degree of correction to various nonuniformities, or "hot spots", in the magnetization of the permanent magnet.

Figure 3:
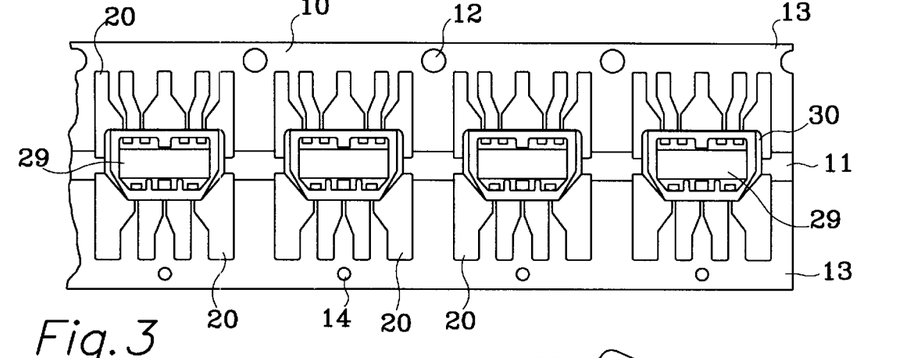
FIG. 3 shows a strip of material with lead assemblies partially encapsulated with insulative material.

FIG. 3 shows the strip of material 10 after it has been inserted into a molding press and after a plastic material has been injected into the molding cavities of the press. In a typical application of this type, the strip of material 10 would comprise more lead assemblies than the four shown in FIG. 3. For example, the strip of material could comprise eight or more lead assembly locations. During the injection molding procedure, each of the lead assemblies would be partially encapsulated, simultaneously, as illustrated in FIG. 3 which shows the insulative carrier 30 disposed around portions of the leads of each lead assembly.

Figure 4:
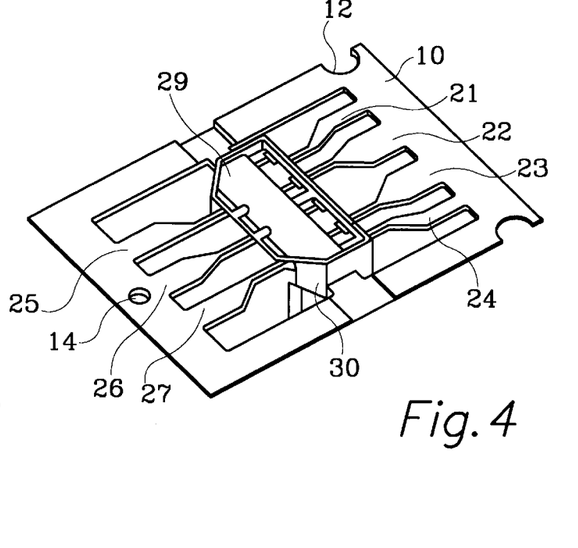
FIG. 4 is a perspective view of one of the partially encapsulated lead assemblies.

FIG. 4 shows an isolated perspective view of one lead assembly with its individual leads, 21–27, partially encapsulated by the insulative carrier 30. Not visible in FIG. 4, but also partially encapsulated by the carrier 30, is a permanent magnet that had been disposed below the lead assembly prior to the injection molding process. When the molten plastic is injected into the individual stations of the molding press, it simultaneously encapsulates the individual leads of the lead assembly and the permanent magnet. The permanent magnet in a preferred embodiment of the present invention, is attached to the lead assembly below the portion identified by reference numeral 29, by a suitable process, such as soldering or by using conductive epoxy. After a permanent magnet is attached to the lead assembly, at each of the lead assembly locations shown in FIGS. 1 or 3, the plastic is injected into the mold cavities to form the subassembly illustrated in FIG. 4. Certain embodiments of the present invention do not require that the permanent magnet be rigidly attached to the lead assembly prior to the injection of plastic during an overmolding procedure. Instead, the plastic itself can be used to attach the permanent magnet to the lead assembly. Since the central portion 11 of the lead assembly is ferromagnetic, it will naturally attach itself to the permanent magnet and this attraction can help to hold it in position during the overmolding procedure.

Figures 5, 6, 7:
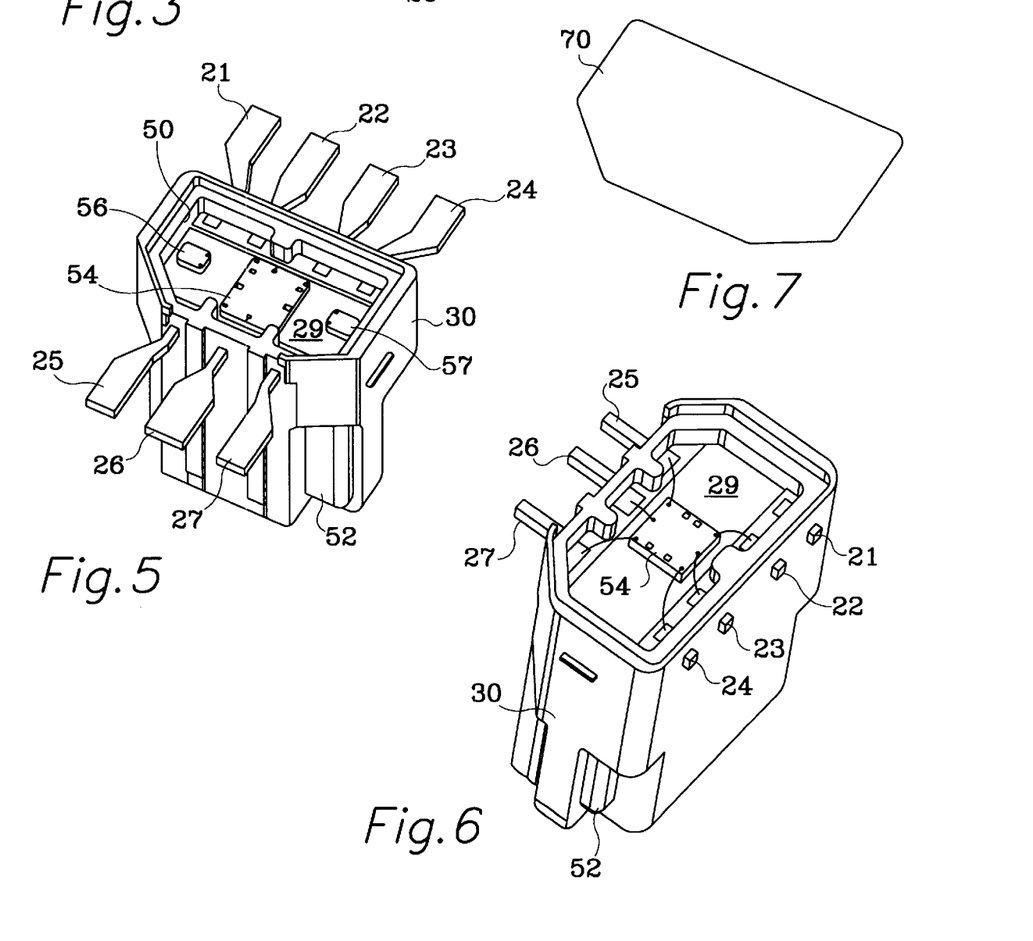
FIG. 5 is a perspective view of a carrier with its partially encapsulated lead assembly and permanent magnet and with three components disposed within a cavity formed in its surface.
FIG. 6 is a later stage of production for the component of FIG. 5, but showing an embodiment of the invention with a single semiconductor chip in the cavity.
FIG. 7 is a cover that can be used to seal the cavity of the device shown in FIG. 5.

FIG. 5 illustrates a perspective view of a single carrier 30 after it has been removed from the strip of material 10 and after certain additional operations have been completed. When the insulative material, such as a 45% glass filled polythalamide, is injected into the mold press, the mold is shaped to define a cavity 50 illustrated at the top portion of the carrier 30 in FIG. 5. The cavity 50 is near an unencapsulated portion of the lead assembly. The portion of the lead assembly identified by reference 29 is exposed at the bottom of the cavity 50. In addition, the internally directed distal ends of the individual leads, 21–27, are exposed at the bottom of cavity 50 as part of the unencapsulated portion of the lead assembly. The permanent magnet 52, which had been previously attached to the lead assembly prior to the encapsulation process either by bonding or magnetic attraction, has a pole face directly below the undersurface of the lead assembly portion identified by reference numeral 29.

With continued reference to FIG. 5, a chip 54 is disposed directly on the lead assembly and attached thereto. The chip 54 can be attached to the lead assembly by a conductive epoxy die attach material, although other suitable processes can also be used. In the illustration shown in FIG. 5, two additional components are also attached to the lead assembly portion identified by reference numeral 29. Those elements, identified by reference numerals 56 and 57, represent separate magnetically sensitive components, such as magnetoresistive strips of iron with a high nickel content, Hall effect elements or other magnetically sensitive material Although the illustration in FIG. 5 shows the semiconductor chip 54 being separate from the elements identified by reference numerals 56 and 57, it should clearly be understood that the magnetically sensitive elements can also be incorporated as integral elements on the semiconductor chip 54. That type of embodiment would comprise only a single chip within the cavity 50 and will be discussed in conjunction with FIG. 6.

With continued reference to FIG. 5, it should be noted that each of the individual leads, 21–27, extend away from the carrier 30 by a significant amount. This is done to permit each of the individual leads, 21–27, to be used as a test point during calibration or testing procedures. During a later step in the process, the four leads, 21–24, will be severed along the back surface of the carrier 30 and the other three leads, 25–27, will be cropped to leave three smaller leads extending from the front surface of the carrier 30.

During the calibration process, the open cavity 50 permits the circuitry on the chip 54 to be adjusted to suit the particular purposes and achieve the desired characteristics of the sensor. By simultaneously probing one or more of the test point leads while the integrated circuit of the chip 54 is laser trimmed, higher accuracies can be achieved. In a typical calibration procedure, a laser would be used to trim selective resistors on the upper surface of the chip 54. The laser trimming process can be done actively while monitoring an output signal from the magnetically sensitive component or passively after a signal has been obtained and used to predetermine a trimming procedure. Although the present invention is described in terms of laser trimming a plurality of resistors during a calibration process, it should be understood that alternative methods of calibrating the device can be used in conjunction with the present invention. For example, instead of using trimmable resistors, certain diode arrays can be selectively altered to achieve proper calibration. This specific type of calibration procedure is not limiting to the present invention.

Figure 8:
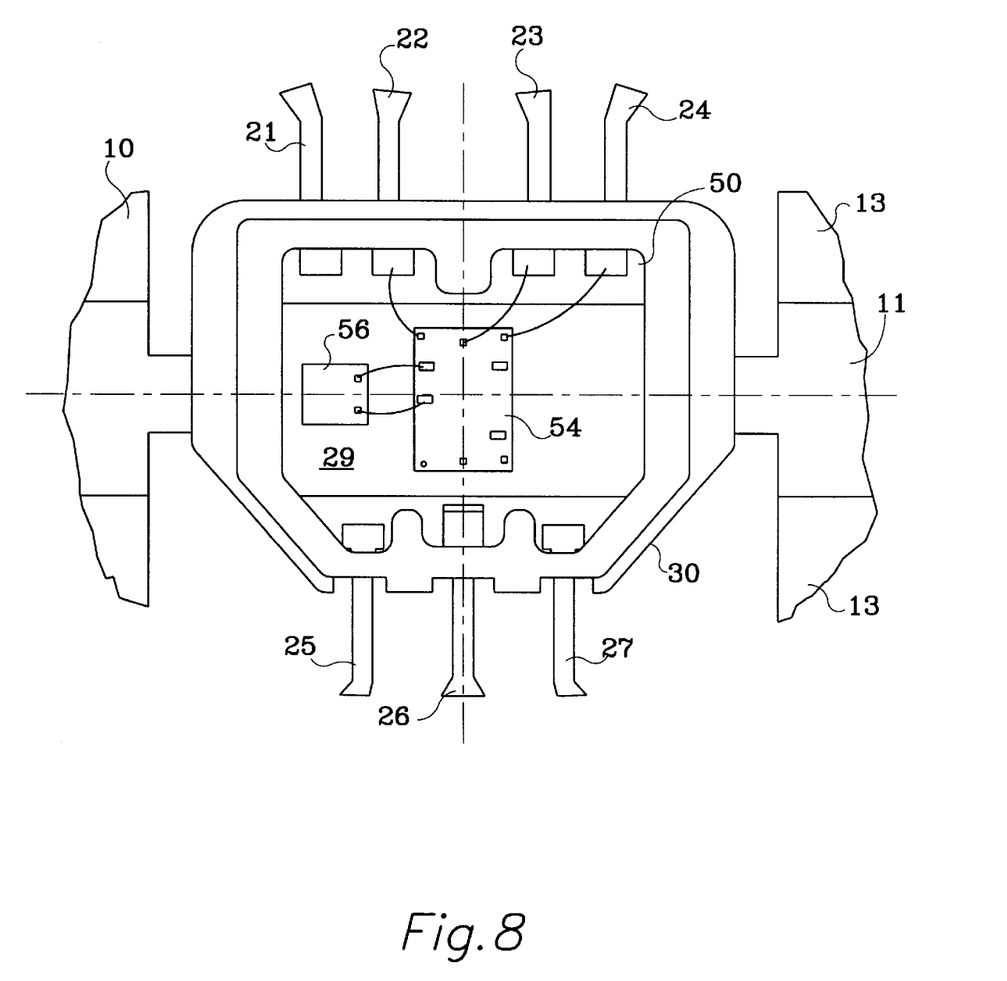
FIG. 8 is a top view of a carrier showing the wire bond connection between two components in the cavity and the exposed portions of the partially encapsulated lead assembly.

FIG. 6 is intended to illustrate the general position of the cavity 50 with respect to the individual leads, 21–27, and the portion of the lead assembly identified by reference numeral 29. In FIG. 6, the four severed leads, 21–24, are shown extending slightly from the back surface of the carrier 30 and the other three leads, 25–27, are shown after being cropped to leave smaller leaves extending from the front surface of the carrier 30. In addition, the perspective view of FIG. 6 illustrates the wire bonds which connect the semiconductor device 54 to the leads identified by reference numerals 22–27. The wire bonds are also illustrated in FIG. 8. FIG. 6 illustrates an embodiment of the invention where all components are included on a single chip 54.

FIG. 7 illustrates a cover 70 that can be used to seal the cavity 50 in order to protect the magnetically sensitive components attached to the portion of the lead assembly identified by reference numeral 29. The cover 70 can be made of beryllium copper in a preferred embodiment of the present invention or, alternatively, can be made of a material that is transparent to certain preselected radiation. In other words, a glass cover 70 could be used to permit the laser trimming operation to be completed after the cover 70 is attached to the carrier 30. In that way, the entire assembly could be manufactured prior to calibration and then, after the cover 70 is attached to the carrier 30 to seal the cavity 50, a laser can be used to pass its beam through the glass cover 70 and trim selected resistors on the chip 54. It should be understood that these options are available within the scope of the present invention, but are not limiting to its scope. Alternatively, a protective compliant gel can be used to fill the cavity 50 over the component 54. Other potting materials can also be used. These options would not necessarily use a cover 70.

FIG. 8 is a top view of an assembly comprising the carrier 30, the lead assembly of individual leads, 21–27, a permanent magnet (not shown), the semiconductor chip 54 the magnetically sensitive element. The two components, 54 and 56, attached to the portion 29 of the lead assembly are connected to each other and to preselected ones of the individual leads by wire bonds as shown. This can be done prior to detaching the carrier 30 and associated lead assembly from the other carriers and lead assemblies on the strip of material 10. With reference to FIGS. 6, 8 and 5, it can be seen that the magnetically sensitive component in the cavity 50 can comprise one, two or three elements, respectively.

Figure 9:
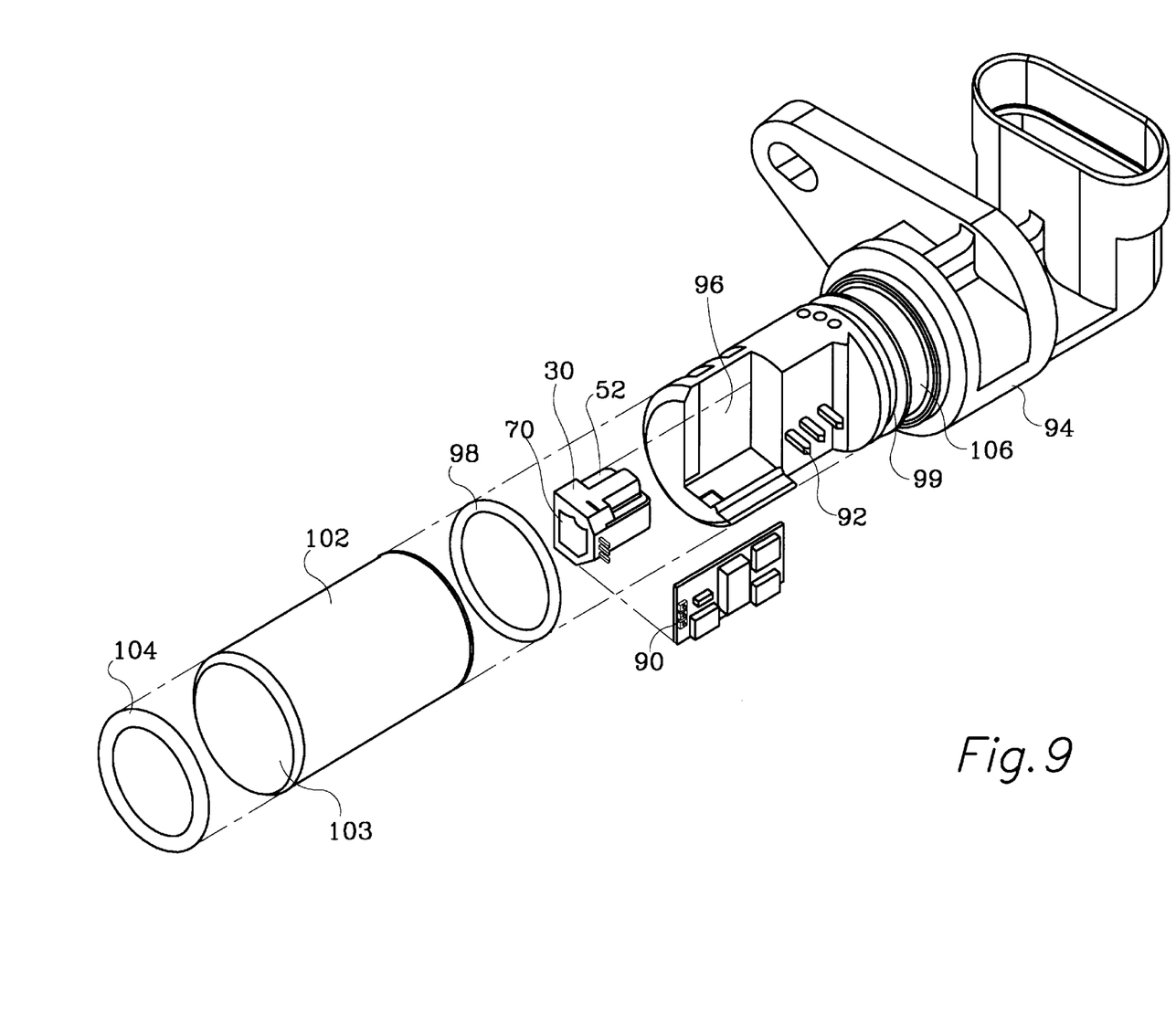
FIG. 9 is an exploded view of a geartooth sensor incorporating the present invention.

FIG. 9 shows an exploded view of a geartooth sensor which incorporates the carrier 30 as described above and illustrated in FIG. 5. The assembly is illustrated with its cover 70 pointing toward the lower left portion of the Figure. The three leads, 25–27, which are not identified by reference numerals in FIG. 9, extend away from the carrier 30 toward a small printed circuit board 90 which is illustrated with exemplary components attached thereto. Alternatively, circuit board 90 could be replaced with a flexible substrate in alternative configurations utilizing the present invention. Three holes extend through the plane of the circuit board 90 and are shaped to receive the three leads, 25–27, in electrical communication therewith following a soldering procedure. The attachment of the three holes to the three leads provides both electrical communication and physical support for the printed circuit board 90 and its associated components. The printed circuit board 90 is also connected to leads 92 that are encapsulated within the larger support structure 94 of the geartooth sensor. In this way, the printed circuit board 90 provides electrical communication between the three leads extending from the carrier 30 and the leads 92 extending from the support structure 94.

With continued reference to FIG. 9, the carrier 30 and its associated components are disposed in the recess 96 formed in the support structure 94. The printed circuit board 90 extends between the leads, 25–27, protruding from the carrier 30 and the leads 92 of the support structure 94. When the printed circuit board 90 is soldered to both sets of leads, the carrier 30 and its associated components are attached to the support structure 94. An O-ring 98 is disposed in groove 99 of the support structure 94 and a protective enclosure 102 is placed around the carrier assembly, the printed circuit board 90 and the distal end of the support structure 94 within which these components are contained. The protective enclosure 102 can be a metal can, as illustrated in FIG. 9, or any other suitable means for protecting the components on the printed circuit board 90 from damage. In certain applications, a second O-ring 104 is disposed within groove 106 of the support structure 94 in order to provide an eventual seal between the support structure 94 and an external component such as an automobile engine, in which the geartooth sensor is to be used.

Figure 10:
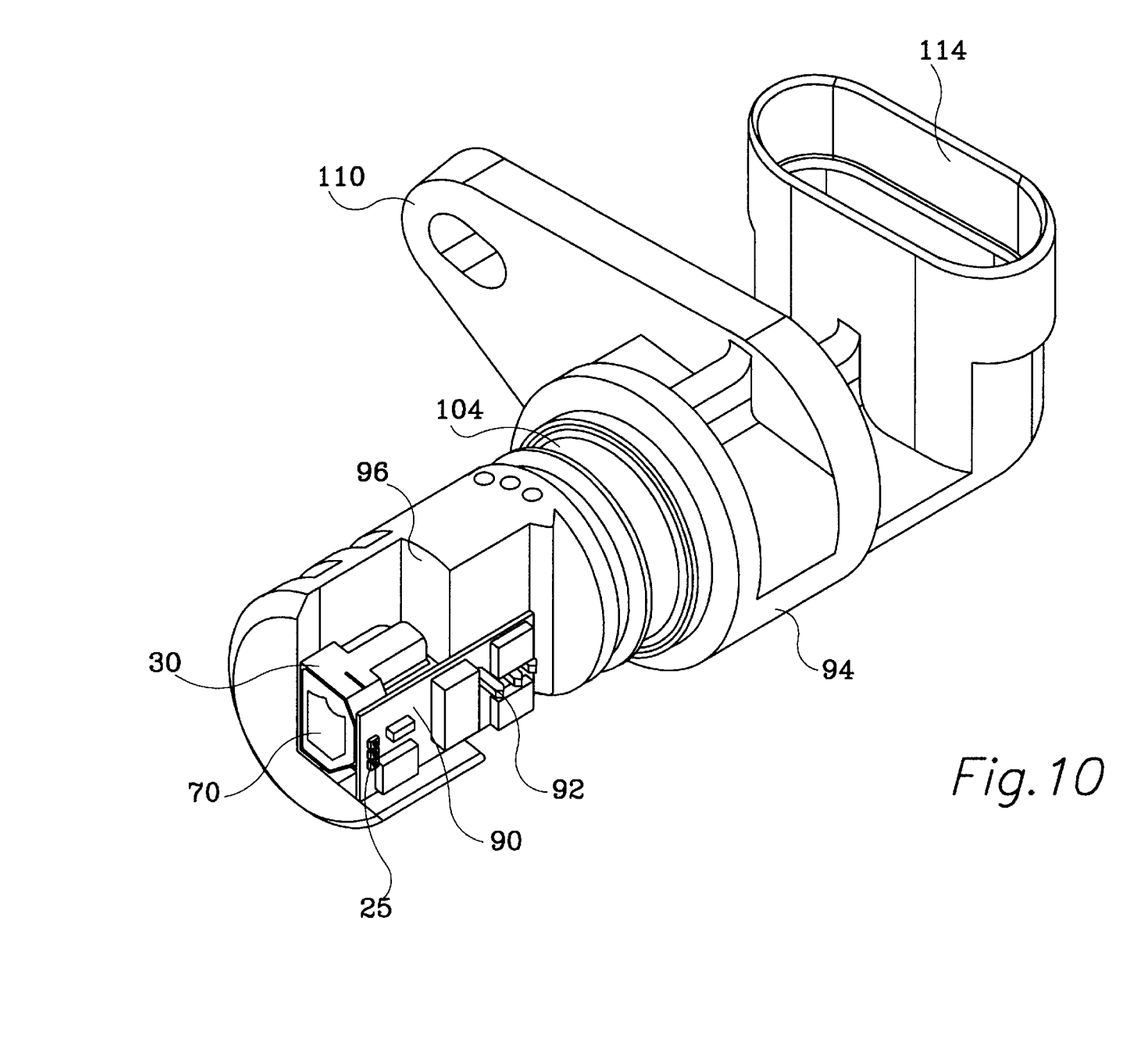
FIG. 10 is an assembled view of the illustration in FIG. 9, but with a protective enclosure removed to facilitate the illustration.

FIG. 10 shows the assembled geartooth sensor, but with the protective enclosure 102 removed to permit the components under the protective enclosure 102 to be seen. The carrier 30, with its associated encapsulated elements, is disposed within the recess 96 and the printed circuit board 90 is attached to the leads, 25–27, of the carrier assembly and to the leads 92 extending from the support structure 94, as described above When the protective enclosure 102, as described above in conjunction with FIG. 9, is placed over the generally cylindrical distal end of the support structure, it provides an environmental protection for the components on the printed circuit board and within the cavity 50 under cover 70. The O-ring 104 is shown in place in-its groove for eventual insertion of the geartooth sensor into a cavity of an automobile engine. A bracket 110 facilitates the attachment of the geartooth sensor to the engine and a socket portion 114 allows the geartooth sensor to be connected in electrical communication with other portions of the automobile engine.

The present invention provides a geartooth sensor with two significant advantageous characteristics. First, the structure of the carrier assembly allows the magnet 52 to be placed closer to the target than previous geartooth sensors allowed. Secondly, the structure of the present invention allows a method of manufacturing to be used which permits higher accuracies to be achieved since the semiconductor chip 54 can be calibrated at a later stage of manufacture than previously known geartooth sensors.

With regard to the characteristic that allows the magnet to be placed more closely to the target, it should be understood that in the past geartooth sensors have been made with small outline integrated circuit (SOIC) component packages. These structures were then typically disposed on an electrical substrate, such as a flex circuit or printed circuit board. The permanent magnet is disposed beneath the SOIC component and is usually separated from it by some type of plastic thickness. In a typical known geartooth sensor package of this type, the resulting distance between the pole face of the permanent magnet and the target comprises the plastic thickness on which the electrical substrate is mounted, the thickness of the electrical substrate (e.g. printed circuit board, flex circuit), and the SOIC thickness which includes the stand off height of the leads, the bottom plastic thickness of the SOIC, the lead frame thickness, the die thickness, the wire bond maximum height, the clearance above the wire bond maximum height and the top plastic thickness of the SOIC. In addition, the package face thickness of the completed geartooth sensor, at its distal end near the tooth detection zone, is disposed between the permanent magnet and the target. In comparison to the known geartooth sensors described immediately above, the present invention significantly reduces the distance between the permanent magnet and the target by employing the chip on lead frame (COL) concept. As a result, the distance between the pole face of the permanent magnet and the target comprises the thickness of the lead assembly shown in FIG. 2, the thickness of the chip 54, the wire bond apex height, clearance above the wire bonds, thickness of cover 70 and the thickness of the protective enclosure 102 at its face which is most proximate the detection zone of the geartooth sensor. By comparing these two alternatives, it can be seen that the present invention significantly reduces the distance between the permanent magnet 52 and the target which would typically be located proximate the face 103 of the protective enclosure 102 shown in FIG. 9. Therefore, it can be seen that the present invention significantly reduces the distance between the permanent magnet 52 and the target. With regard to the second improved characteristic provided by the present invention, FIG. 5 illustrates the cavity 50 provided within the carrier 30 to permit the chip 54 to be calibrated, by trimming resistors of its integrated circuit, after the assembly of the chip and related elements is complete. In certain embodiments of the present invention, the resistors can be trimmed after the cover 70 is attached to the carrier 30. The basic structure illustrated in FIG. 5, with the chip 54 being attached to the portion 29 of the lead assembly, significantly reduces the stress on the chip that could otherwise be induced by overmolding the chip with the insulative material of the carrier. When overmolding is used, significant stresses can be induced in the semiconductor components. In addition, the encapsulated chip can no longer be calibrated to compensate for the stresses. The present invention addresses both of these problems. First, it places the semiconductor chip 54 and related elements within a cavity 50. In this way, the magnetically sensitive components are not overmolded and the potential stresses from encapsulation are avoided. Instead, the components are retained within cavity 50 with very little stress transmitting contact between them and the surrounding structure. By allowing the calibration procedure to be completed, with the laser trimming of resistors, during the later portions of the manufacturing procedure, the potentially induced stresses that occur during the manufacturing process can be compensated. Therefore, the present invention provides two significant advantages relating to the dimension between the magnet and the target and relating to the induced stresses that could adversely affect the accuracy of the sensor.

Although the present invention has been described with significant detail and particularly illustrated to demonstrate a preferred embodiment, other embodiments are within its scope. The present invention has been described in terms of attaching a pole piece to a magnet pole face. As discussed above, the rigid attachment of a pole piece to the face of a magnet is not a requirement in all embodiments of the present invention. In addition, the strip of material used to form the plurality of lead assemblies can be a combination of three strips of material, with a center strip being ferromagnetic. The cover that is disposed over the cavity formed above the lead assembly can be transparent to certain types of electromagnetic radiation in certain embodiments of the present invention, but can be metallic in other embodiments. The calibration process described above involved the use of a laser to trim a plurality of resistors on the semiconductor device within the cavity of the structure, but the calibration procedure could be performed in several other ways that are known to those skilled in the art. Furthermore, the calibration procedure can be accomplished prior to the placement of the cover over the cavity or subsequent to the placement of the cover over the cavity if a calibration technique is used which does not require an open cavity for these purposes.

The embodiments of the invention in which an exclusive property or right is claimed are defined as follows:

1. A geartooth sensor, comprising:
    a lead assembly, said lead assembly being made of ferromagnetic material;
    a bias magnet, a pole face of said magnet being disposed adjacent said lead assembly;
    a carrier formed from an electrically insulative material, said lead assembly and said magnet being at least partially encapsulated and immobile within said carrier, said carrier being shaped to form a cavity proximate an unencapsulated portion of said lead assembly, said unencapsulated portion of said lead assembly being exposed within said cavity; and
    a magnetically sensitive component biased by said magnet and disposed within said cavity and connected in electrical communication with at least one of a plurality of individual leads of said lead assembly.

2. The sensor of claim 1, wherein:
    said magnetically sensitive component comprises a Hall effect element.

3. The sensor of claim 1, wherein:
    said magnetically sensitive component comprises a magnetoresistive element made of nickel iron.

4. The sensor of claim 1, further comprising:
    a cover disposed over said cavity.

5. The sensor of claim 4, further comprising:
    a protective enclosure disposed over said carrier, said cover, said lead assembly and said magnetically sensitive component.

6. The sensor of claim 4, wherein:
    said cover is transmissive to a radiation beam.

7. The sensor of claim 1, wherein:
    said cover is made of beryllium copper.

8. The sensor of claim 1, wherein:
    said magnetically sensitive component is an unencapsulated semiconductor chip attached directly to a preselected one of said plurality of individual leads of said lead assembly at said exposed unencapsulated portion within said cavity.

9. The sensor of claim 8, wherein:
    said magnet is attached to said lead assembly with solder.

10. The sensor of claim 8, wherein:
    said magnet is attached to said lead assembly with conductive epoxy.

11. The sensor of claim 1, wherein:
    said magnetically sensitive component comprises a plurality of discrete semiconductive chips.

12. A geartooth sensor, comprising:
    a lead assembly, said lead assembly being made of a ferromagnetic material;
    a bias magnet, a pole face of said magnet being disposed adjacent said lead assembly;
    a carrier formed from an electrically insulative material, said lead assembly and said magnet being at least partially encapsulated and immobile within said carrier, said carrier being shaped to form a cavity proximate an unencapsulated portion of said lead assembly, said unencapsulated portion of said lead assembly being exposed within said cavity; and
    a magnetically sensitive component biased by said magnet and disposed with said cavity and connected directly on at least one of a plurality of individual leads of said lead assembly, said magnetically sensitive component being an unencapsulated semiconductor.

13. The sensor of claim 12, wherein:
    said magnetically sensitive component comprises a Hall effect element.

14. The sensor of claim 12, wherein:
    said magnetically sensitive component comprises an iron element with a nickel content greater than 60%.

15. The sensor of claim 12, further comprising a cover disposed over said cavity.

16. The sensor of claim 15, wherein:
    said cover is made of beryllium copper.

17. The sensor of claim 15, further comprising:
    a protective enclosure disposed over said carrier, said cover, said lead assembly and said magnetically sensitive component.

18. The sensor of claim 15, wherein:
    said cover is made of glass.

19. A geartooth sensor, comprising:
    a lead assembly, said lead assembly being made of a ferromagnetic material;
    a bias magnet, a pole face of said magnet being disposed adjacent said lead assembly;
    a carrier formed from an electrically insulative material, said lead assembly and said magnet being at least partially encapsulated and immobile within said carrier, said carrier being shaped to form a cavity proximate an unencapsulated portion of said lead assembly, said, unencapsulated portion of said lead assembly being exposed within said cavity;

a magnetically sensitive component biased by said magnet and disposed within said cavity and connected directly on at least one of a plurality of individual leads of said lead assembly, said magnetically sensitive component being an unencapsulated semiconductor chip attached directly to a preselected one of said plurality of individual leads of said lead assembly at said exposed unencapsulated portion within said cavity;

a cover disposed over said cavity, said cover being made of beryllium copper; and a protective enclosure disposed over said carrier, said cover, said lead assembly and said magnetically sensitive component.

\* \* \* \* \*